United States Patent
Nakamura (10) Patent No.: US 9,215,783 B2
(45) Date of Patent: Dec. 15, 2015

(54) LIGHTING MODULE HAVING SURFACE LIGHT SOURCE AND LIGHTING SYSTEM

(75) Inventor: Takeshi Nakamura, Kawasaki (JP)

(73) Assignee: PIONEER CORPORATION, Kawasaki (JP)

(*) Notice: Subject to any disclaimer, the term of this patent is extended or adjusted under 35 U.S.C. 154(b) by 0 days.

(21) Appl. No.: 14/415,498

(22) PCT Filed: Jul. 24, 2012

(86) PCT No.: PCT/JP2012/068689
§ 371 (c)(1),
(2), (4) Date: Jan. 16, 2015

(87) PCT Pub. No.: WO2014/016904
PCT Pub. Date: Jan. 30, 2014

(65) Prior Publication Data
US 2015/0208485 A1    Jul. 23, 2015

(51) Int. Cl.
*H05B 37/02* (2006.01)

(52) U.S. Cl.
CPC ........ *H05B 37/0227* (2013.01); *H05B 37/0245* (2013.01); *H05B 37/0254* (2013.01); *H05B 37/0218* (2013.01)

(58) Field of Classification Search
None
See application file for complete search history.

(56) References Cited

U.S. PATENT DOCUMENTS

| | | | |
|---|---|---|---|
| 7,916,015 B1* | 3/2011 | Evancich et al. | 340/539.26 |
| 8,531,394 B2* | 9/2013 | Maltz | 345/156 |
| 2003/0036807 A1* | 2/2003 | Fosler | 700/3 |
| 2010/0052866 A1 | 3/2010 | Elferich et al. | |
| 2010/0277079 A1* | 11/2010 | Van Der Veen et al. | 315/152 |
| 2012/0250627 A1* | 10/2012 | McCormack et al. | 370/328 |
| 2014/0001977 A1* | 1/2014 | Zacharchuk et al. | 315/291 |

FOREIGN PATENT DOCUMENTS

| | | |
|---|---|---|
| JP | 11-283757 B | 10/1999 |
| JP | 2008-293720 A | 12/2008 |
| JP | 2009-205810 A | 9/2009 |
| JP | 2010-510621 B | 4/2010 |
| JP | 2010-165522 A | 7/2010 |
| JP | 4567092 B | 8/2010 |
| JP | 2010-211938 B | 9/2010 |
| JP | 4976605 B | 4/2012 |

OTHER PUBLICATIONS

International Search Report and Written Opinion dated Oct. 10, 2012, issued for International Application No. PCT/JP2012/068689.

* cited by examiner

*Primary Examiner* — Crystal L Hammond
(74) *Attorney, Agent, or Firm* — Procopio, Cory, Hargreaves & Savitch LLP (57) ABSTRACT

A lighting system includes a master device for transmitting a light emission control command, and a plurality of lighting modules. Each of the plurality of lighting modules has a surface light source, receives the light emission control command, and drives and controls the surface light source in accordance with control data for its own, the control data being included in the received light emission control command.

7 Claims, 5 Drawing Sheets

AA: BREAK SIGNAL
BB: START CODE

FIG. 4

AA: BREAK SIGNAL

AA: BREAK SIGNAL
BB: COMMAND LENGTH
CC: COMMAND NUMBER

FIG. 7

| AA | GG | HH | DATA0 | DATA1 |
|----|------|------|-------|-------|
| BB | 0x01 | 0x00 |       |       |
| CC | 0x01 | 0x01 |       |       |
| DD | 0x01 | 0x10 |       |       |
| EE | 0x01 | 0x11 |       |       |
| FF | 0x03 | 0x80 | AD-H  | AD-L  |

AA: TYPES OF COMMANDS
BB: ADDRESS MODE START COMMAND
CC: ADDRESS MODE END COMMAND
DD: ADDRESS REQUEST COMMAND
EE: ADDRESS REQUEST-AND-END COMMAND
FF: ADDRESS ASSIGNMENT COMMAND
GG: COMMAND LENGTH
HH: COMMAND NUMBER

FIG. 8

AA: BREAK SIGNAL
BB: RED BRIGHTNESS DATA
CC: GREEN BRIGHTNESS DATA
DD: BLUE BRIGHTNESS DATA

LIGHTING MODULE HAVING SURFACE LIGHT SOURCE AND LIGHTING SYSTEM

TECHNICAL FIELD

The present invention relates to a lighting module having a surface light source, and a lighting system including a master device that controls a plurality of lighting modules.

BACKGROUND ART

A light-emitting device using an organic EL panel having an organic EL element as a light-emitting source has been proposed. A light-emitting device using an organic EL panel is characterized in that it is surface-emitting and there is no limitation on its shape, and such a characteristic cannot be obtained by other light-emitting devices such as LED (light-emitting diode) light-emitting devices. Therefore, further developments are expected toward its practical application in the future.

Generally, an organic EL panel as a light-emitting source of a light-emitting device includes: an anode formed from a transparent conductive film such as ITO formed on a transparent substrate; a cathode formed from a metal such as Al; and an organic light-emitting functional layer having an organic multi-layer structure interposed in between the anode and the cathode (Patent Literature 1). The organic light-emitting functional layer is formed from an organic material, and is a laminate formed from a hole injection/transport layer, a light-emitting layer, an electron transport layer, and an electron injection layer in this order from the anode side, for example. The laminate can be made by using a vacuum deposition method or an inkjet method, for example. In such an organic EL panel, the organic light-emitting functional layer is formed in a stripe pattern so that a high brightness can be obtained across the entire panel.

Arranging a plurality of such organic EL panels in a planar pattern (called "tiling") enables a novel form of lighting, such as a light-emitting ceiling or a light-emitting wall, and it is expected to provide a new value to our daily life.

There is one form of lighting using tiling, in which all the organic EL panels are lit and turned off at the same time. This can be realized simply by turning on/off the power of all the organic EL panels.

Another form of lighting is a form in which the ceiling as a whole or the wall as a whole is used for stage-effect lighting by individually controlling a plurality of organic EL panels. For example, it is possible to express two-dimensional meaningful information or a pattern by controlling the brightness or the color of each organic EL panel.

The DMX512-A standard is a lighting control technique suitable for controlling an organic EL panel for such stage-effect lighting.

A lighting system using the DMX512-A standard is premised on the configuration with one master device responsible for lighting control, and a plurality of lighting modules (slave devices) to be subjected to the lighting control. Where the DMX512-A standard is applied to a lighting system in which a plurality of organic EL panels are tiled as described above, the master device transmits a command including control data to each of a plurality of lighting modules via a communication line, and each of the plurality of lighting modules including an organic EL panel receives the command to drive the organic EL panel according to the control data in the command.

CITATION LIST

Patent Literature

Patent Literature 1: Japanese Patent No. 4567092

SUMMARY OF INVENTION

Technical Problem

However, in a lighting system using the DMX512-A standard, it is necessary to assign different addresses to the respective lighting modules so as to distinguish the plurality of lighting modules from one another. In a conventional lighting system, the address of each of the plurality of lighting modules is typically set by using a dip switch or a rotary switch. This address setting needs to be done manually, and one can easily imagine that this would be a demanding operation if the number of lighting modules is large. Moreover, in the operation of manually setting address values, errors such as address duplication are likely to occur, and it would of course be a demanding operation to check for such errors.

Moreover, there is another problem beside the manual address setting being troublesome. As described above, one important application of a surface-emitting panel such as an organic EL panel is tiling. The light-emitting surfaces of the organic EL panels should only be the tile surfaces that can be seen from users, and the switches in lighting modules, the panel drive control sections, wiring, etc., should be installed hidden on the rear side of the panel, for example, inside the ceiling. Therefore, the address setting operation needs to be completed before installing the lighting modules on the intended surface, and it is difficult to set or change addresses after the installation of the lighting modules.

Furthermore, it is understood that it may not be sufficient to simply set individual addresses, and an intended lighting stage-effect cannot be realized properly unless the correspondence between the position of each lighting module on the tiling and its address is completely recognized by the master device or by users.

In view of this, an example of the problem to be solved by the present invention is the drawback described above, and an object of the present invention is to provide lighting modules and a lighting system, in which addresses can be allotted to respective lighting modules through a simple manual operation in such a manner that the correspondence between the position of each lighting module and its address is clear.

Solution to Problem

A lighting module of the invention according to claim 1 is a lighting module which has a surface light source, and receiving a light emission control command transmitted from a master device, and driving and controlling the surface light source in accordance with control data for its own, the control data being included in the received light emission control command.

The lighting module includes: an external input detection sensor provided on a light-emitting surface of the surface light source or in a vicinity thereof, for detecting an external input; transmitting means for transmitting an address request command to the master device when the external input is detected by the external input detection sensor; acquisition means for receiving an address assignment command transmitted from the master device in response to the address request command so as to acquire an address included in the address assignment command; and means for extracting the control data for its own from the light emission control command according to the address acquired by the acquisition means.

A lighting system of the invention according to claim 7 is a lighting system including: a master device for transmitting a light emission control command; and a plurality of lighting modules, each lighting module having a surface light source, receiving the light emission control command, and driving and controlling the surface light source in accordance with control data for its own, the control data being included in the received light emission control command. The lighting system includes: an external input detection sensor provided on a light-emitting surface of the surface light source of each of the plurality of lighting modules or in a vicinity thereof, for detecting an external input; transmitting means for transmitting an address request command to the master device when the external input is detected by the external input detection sensor; address setting means provided in the master device, for setting an address in response to the address request command; and returning means for returning an address assignment command including the address which has been set by the address setting means to the lighting module which has transmitted the address request command, each of the plurality of lighting modules including: acquisition means for receiving the address assignment command so as to acquire an address included in the address assignment command; and means for extracting the control data for its own from the light emission control command according to the address acquired by the acquisition means.

DESCRIPTION OF EMBODIMENTS

An embodiment of the present invention will now be described in detail with reference to the drawings.

A lighting system of an embodiment illustrated in

Figure 1:
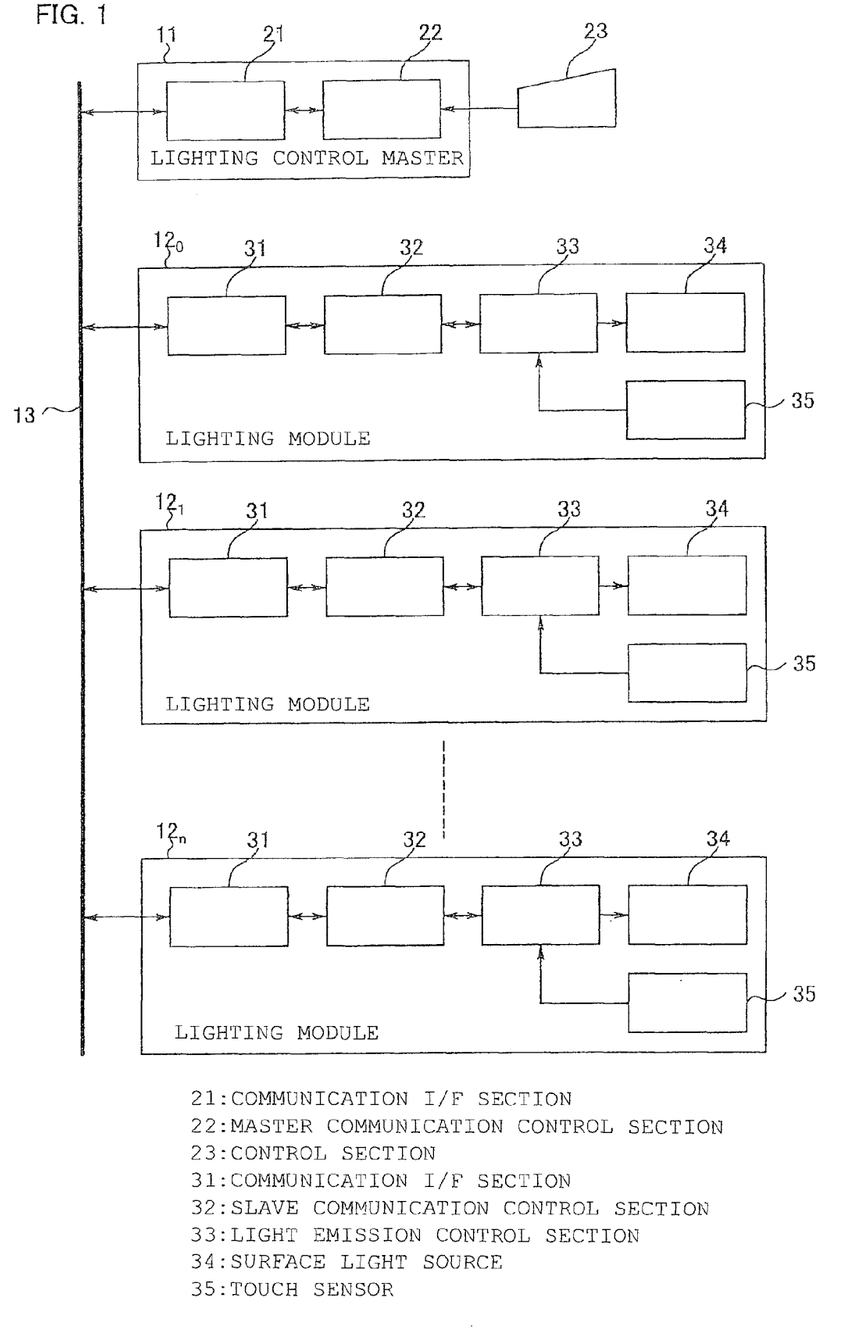
FIG. 1 is a block diagram illustrating a lighting system of an embodiment of the present invention.

FIG. 1 includes a lighting control master 11 (master device), and a plurality of lighting modules (slave devices) $12_0$ to $12_n$ (where n is a positive integer). The lighting control master 11 and the plurality of lighting modules $12_0$ to $12_n$ are connected to each other by a communication line 13.

The lighting control master 11 is a controller that controls the operation of each of the plurality of lighting modules $12_0$ to $12_n$. The lighting control master 11 includes a communication I/F (interface) section 21, and a master communication control section 22. The communication I/F section 21 is connected to the communication line 13, and transmits/receives commands to be described later to/from each of the plurality of lighting modules $12_0$ to $12_n$. The master communication control section 22 is connected to the communication I/F section 21, is constituted by a microcomputer, for example, and generates commands to control the operation of each of the plurality of lighting modules $12_0$ to $12_n$ and supplies the commands to the communication I/F section 21 so that the commands are transmitted therefrom. The master communication control section 22 interprets the content of the command received by the communication I/F section 21, and generates a command to respond to the received command.

An operation section 23 is connected to the master communication control section 22, accepts an input operation from a user, and issues an instruction corresponding to the input operation to the master communication control section 22. While the operation section 23 is provided outside the lighting control master 11 in the embodiment, it may be provided as a part of the lighting control master 11.

The plurality of lighting modules $12_0$ to $12_n$ are tiled on a ceiling, a wall, or the like, each as an organic EL panel having a surface light source 34 formed from an organic EL element to be described later. The plurality of lighting modules $12_0$ to $12_n$ have the same configuration, each including a communication I/F (interface) section 31, a slave communication control section 32, a light emission control section 33, and the surface light source 34. The communication I/F section 31 is connected to the communication line 13, and transmits/receives commands to/from the lighting control master 11. The slave communication control section 32 is separately connected to the communication I/F section 31 and the light emission control section 33, and extracts control data intended for the subject module from the command received by the communication I/F section 31 so as to supply the control data to the light emission control section 33. The slave communication control section 32 interprets the content of the command received by the communication I/F section 31, and generates a command to respond to the received command. The light emission control section 33 is connected to the surface light source 34, and drives and controls the surface light source 34 in accordance with the control data supplied from the slave communication control section 32. The slave communication control section 32 and the light emission control section 33 may be configured by a single microcomputer, for example.

Figure 2:
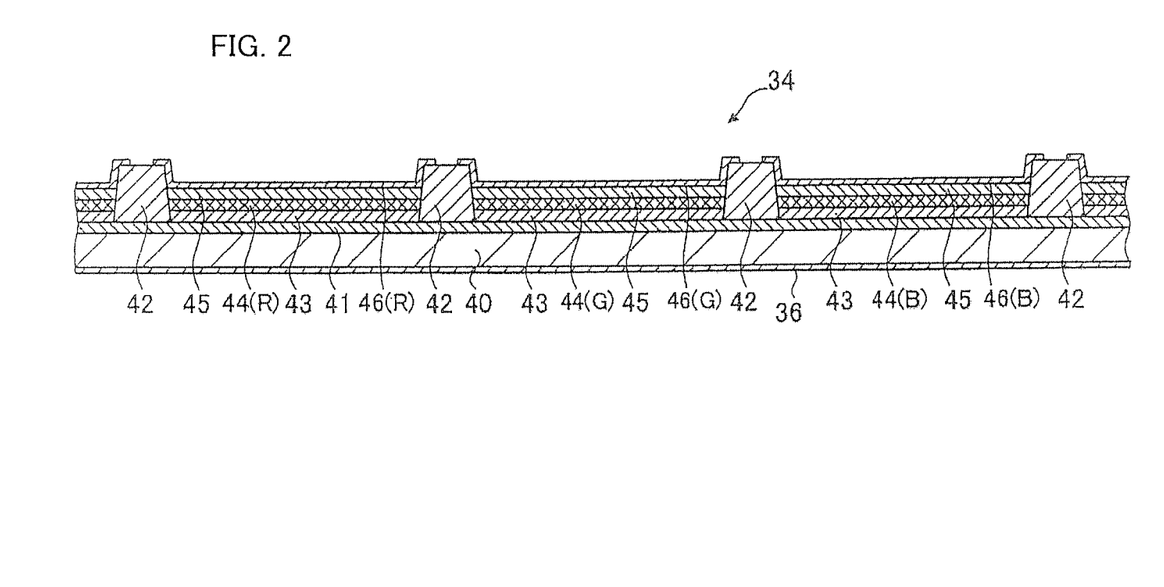
FIG. 2 is a cross-sectional view of a surface light source in a lighting module of FIG. 1.

The surface light source 34 includes a transparent electrode 41 formed as an anode on a glass substrate 40, as illustrated in FIG. 2. The transparent electrode 41 is formed by a sputtering method, and is formed from an ITO film. A plurality of elongated banks 42 are arranged in parallel at regular intervals on the transparent electrode 41. The banks 42 are formed from an organic insulating material. An organic insulating material is applied onto the transparent electrode 41 by a spin coating method or a printing method, allowed to dry, and then patterned by a photolithography technique, thereby forming the banks 42. Each bank 42 has a trapezoidal cross section in the direction perpendicular to the longitudinal direction thereof, and has forward tapered side surfaces on the transparent electrode 41. Note that a bus line for power supply (not shown) is formed on the transparent electrode 41 at a position where the bank 42 is formed, and the bus line is covered by the bank 42.

The light-emitting regions described above are located between adjacent banks 42. In each light-emitting region, a hole injection layer 43, a light-emitting layer 44, and an electron injection layer 45 are formed in this order as an organic light-emitting structure layer. Each of the hole injection layer 43, the light-emitting layer 44 and the electron injection layer 45 is formed by applying an ink containing the respective material therein by using an application method such as an inkjet method, and then drying the ink after the application. For the light-emitting layer 44, light-emitting layers of different colors are arranged for light-emitting regions adjacent to one another, i.e., a red light-emitting layer 44(R), a green light-emitting layer 44 (G), and a blue light-emitting layer 44 (B) are repeated in this order in the direction in which the banks 42 are arranged in parallel. Note that the organic light-emitting structure layer is not limited to the configuration described above, but may be a configuration in which a hole transport layer is formed between the hole injection layer 43 and the light-emitting layer 44, and an electron transport layer is formed between the light-emitting layer 44 and the electron injection layer 45.

On the electron injection layer 45, an Al film is vacuum-deposited by a vacuum deposition method, for example, and is further patterned by a photolithography technique, thereby forming metal electrodes 46(R), 46(G), and 46 (B) as cathodes for each set of RGB.

The light emission control section 33 individually supplies a drive current between the transparent electrode 41 and each of the metal electrodes 46(R), 46(G), and 46(B). The level of each drive current is determined in accordance with the control data described above, and light is emitted in the light-emitting region with a brightness in accordance with the level of the drive current.

As the light-emitting layer 44 (44(R), 44(G), 44(B)) of the surface light source 34 emits light, the light is output to the outside via the hole injection layer 43, the transparent electrode 41, and the glass substrate 40. Light generated in the light-emitting layer 44 is reflected by the metal electrode 46 (46(R), 46(G), 46(B)) via the electron injection layer 45, and the reflected light is output to the outside via the electron injection layer 45, the light-emitting layer 44, the hole injection layer 43, the transparent electrode 41, and the glass substrate 40. The output light is a chromatic mixture of red light, green light, and blue light depending on the brightness of each light. If the red light, the green light, and the blue light have an equal brightness, they will be output as white light.

Each of the plurality of lighting modules $12_0$ to $12_n$ further includes a touch sensor 35 (external input detection sensor). The touch sensor 35 is connected to the light emission control section 33. As illustrated in FIG. 2, the touch sensor 35 includes a transparent touch panel 36 of an ITO film, or the like, attached on the light output surface of the glass substrate 40, which is the light-emitting surface of the surface light source 34, and detects a touch on the light-emitting surface by a user in accordance with the electrostatic method or the resistive method.

In a lighting system having such a configuration, a communication protocol standard, called DMX512-A, is used as described above for controlling the plurality of lighting modules $12_0$ to $12_n$ by means of the lighting control master 11.

Figure 3:
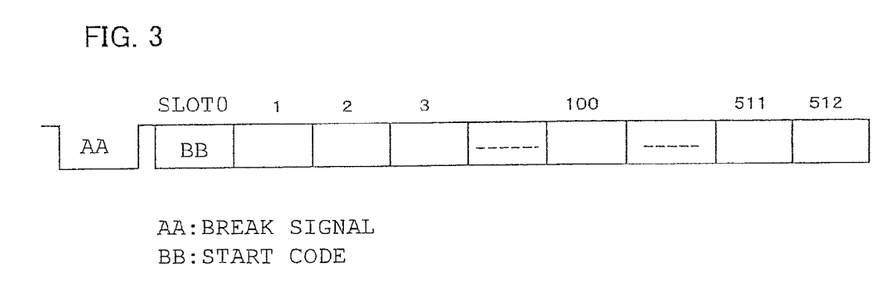
FIG. 3 is a diagram illustrating a command format for asynchronous serial communication used in the lighting system of FIG. 1.

In DMX512-A, the EIA-485 standard (=RS-485 standard) is employed for electrical specifications of the communication line, and asynchronous serial communication is performed. As illustrated in FIG. 3, the command format for asynchronous serial communication has a simple packet configuration including a 1-byte start code (Slot 0) and the following 512-byte data portion (Slots 1-512), subsequent to the start signal called the break signal. Typically, what is used is the start code=0x00, called "null command," and this is used for lighting control and for controlling various devices.

Figure 4:
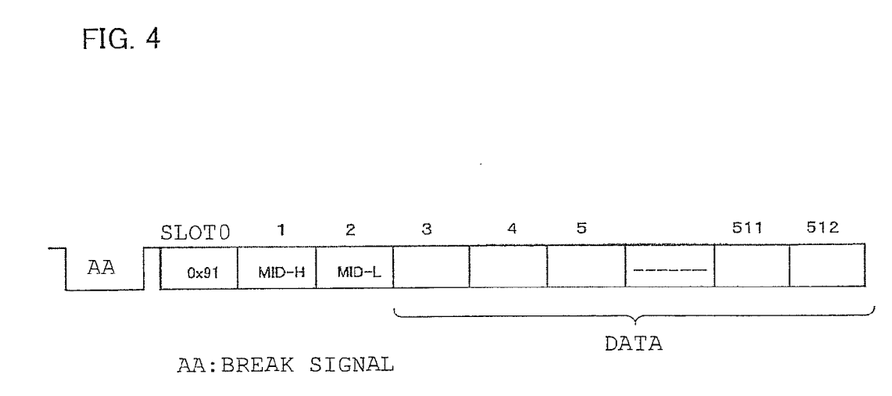
FIG. 4 is a diagram illustrating a command format for an original command of the DMX512-A standard used in the lighting system of FIG. 1.

There is also a function of transmitting original commands, thereby transmitting a start code of 0x91, then a 2-byte MID, called "Manufacturer ID," which identifies the company/organization, and data (=original command) in the subsequent slots. Note that MID-H is the upper byte of MID, and MID-L is the lower byte of MID.

Where a plurality of devices are controlled using the DMX512-A standard, each device is allotted a value called "DMX address." Data at a slot position corresponding to the DMX address is the instruction to that device. That is, when an instruction to each device is 1-byte long, a maximum of 512 devices can be controlled.

Therefore, with the lighting system of the embodiment, in order for the lighting control master 11 to control each of the lighting modules $12_0$ to $12_n$, which are objects to be controlled, it is necessary in advance to assign (allocate) DMX addresses to the lighting modules $12_0$ to $12_g$.

Figure 5:
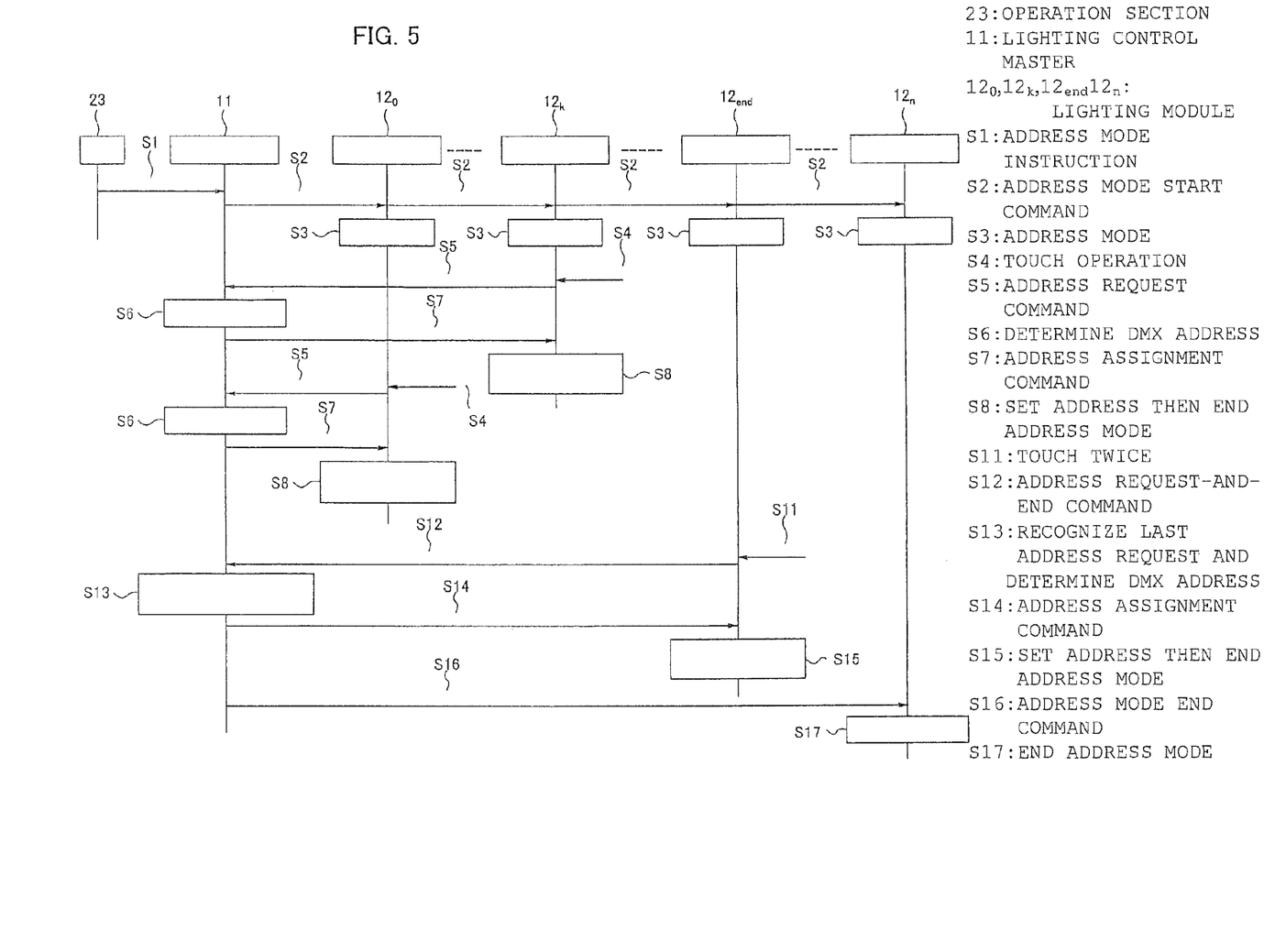
FIG. 5 is a sequence diagram illustrating an address assignment operation of the lighting system of FIG. 1.

Next, the DMX address assignment operation will be described with reference to the sequence diagram of FIG. 5.

When starting the operation of assigning DMX addresses, first, the entire lighting system is set to the address mode. In response to an input operation by a user to the operation section 23, an address assignment instruction is generated from the operation section 23 (step S1), and in response to the address assignment instruction, the master communication control section 22 generates a command to start the address mode for each of the plurality of lighting modules $12_0$ to $12_n$. The generated address mode start command is passed to the communication I/F section 21, and is transmitted from the communication I/F section 21 to the respective lighting modules $12_0$ to $12_n$, via the communication line 13 (step S2).

Figure 6:
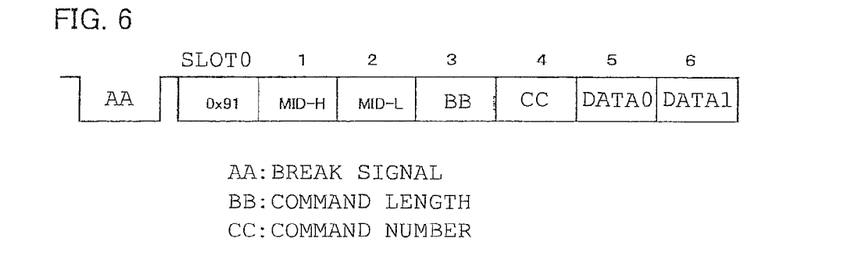
FIG. 6 is a diagram illustrating a command format for a command used in an address mode.
Figure 7:
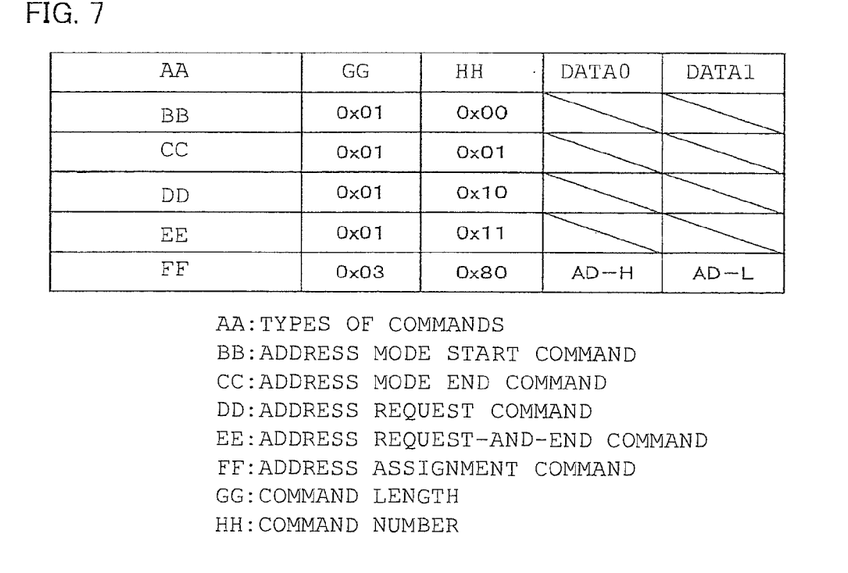
FIG. 7 is a chart illustrating types of commands of FIG. 6, and the contents of respective parameters for each type.

Commands to be used here use the format for original commands of the DMX512-A standard described above. As illustrated in FIG. 6, Slot 0 to Slot 2 are as illustrated in FIG. 4. Slot 3 is the command length (the number of bytes), and Slot 4 is the command number representing the content of the command. As illustrated in FIG. 7, for the start of the address mode, the command length of Slot 3 is 0x01, and the command number of Slot 4 is 0x00.

As can be seen from FIG. 7, the format of the original command is not limited to the address mode start command, but is also used in other commands such as the address mode end command, the address request command, the address request & end command, and the address assignment command. For the address assignment command, the command length is 0x03, and Slots 5 and 6 are used. Slot 5 is the upper eight bits (AD-H) of the DMX address, and Slot 6 is the lower eight bits (AD-L) of the DMX address. Commands illustrated herein are those to be used in the address mode, and commands are not only transmitted from the lighting control master 11 but commands are also transmitted from the lighting modules $12_0$ to $12_n$.

In each of the lighting modules $12_0$ to $12_n$, the communication I/F section 31 receives the address mode start command transmitted from the lighting control master 11. The received command is supplied to the slave communication control section 32, and when it is detected that Slot 0 of the command is 0x91, indicating an original command, the slave communication control section 32 sets the mode of operation of the lighting module to the address mode in accordance with the command number 0x00 in subsequent Slot 4 (step S3).

In the address mode, of the plurality of lighting modules $12_0$ to $12_n$, the light-emitting surfaces of the lighting modules are touched in the order the user wishes. That is, the touch panel 36 provided on the light-emitting surface is touched (step S4). The touched lighting module is denoted as $12_k$ (one of $12_0$ to $12_n$).

In the touched lighting module $12_k$, the touch detection output from the touch sensor 35 is supplied to the light emission control section 33. Moreover, the light emission control section 33 notifies the slave communication control section 32 of the touch detection. The slave communication control section 32 generates an address request command in response to the touch detection. In an address request command, as illustrated in FIG. 7, the command length is 0x01, and the command number is 0x10. The generated address request command is passed to the communication I/F section 31, and is transmitted from the communication I/F section 31 to the lighting control master 11 via the communication line 13 (step S5). The lighting module $12_k$, having transmitted the address request command, enters a response command waiting state. The transmission of the address request command in step S5 corresponds to the transmitting means.

In the lighting control master 11, when the communication I/F section 21 receives a command, the received command is supplied to the master communication control section 22. In the address mode, when it is detected that Slot 0 of the command is 0x91, indicating an original command, the master communication control section 22 sequentially determines the DMX address in accordance with the command number 0x10 in subsequent Slot 4 (step S6). The DMX address value is determined so that it increases in the order the address request commands are received after the start of the address mode. Then, an address assignment command including the determined DMX address is generated. As described above, the address assignment command includes the upper eight bits (AD-H) of the DMX address in Slot 5, and includes the lower eight bits (AD-L) of the DMX address in Slot 6. The determination of the DMX address in step S6 corresponds to the address setting means.

The generated address assignment command is passed to the communication I/F section 21, and is returned by the communication I/F section 21 to the lighting module $12_k$ via the communication line 13 (step S7). In practice, the address assignment command is transmitted to all the lighting modules $12_0$ to $12_n$, including the lighting module $12_k$. The returning of the address assignment command in step S7 corresponds to the returning means.

In the lighting module $12_k$, the communication I/F section 31 receives the address assignment command transmitted from the lighting control master 11. The received command is supplied to the slave communication control section 32, and the slave communication control section 32, which is in the response command waiting state immediately after transmitting the address request command as described above, accepts the command.

In the lighting modules $12_0$ to $12_n$, excluding the lighting module $12_k$, which are not in the response command waiting state, the slave communication control section 32 in those lighting modules ignores the address assignment command.

Having confirmed that the accepted command is an address assignment command on the basis of its Slot 0 to Slot 4, the slave communication control section 32 of the lighting module $12_k$ extracts the DMX address from Slot 5 and Slot 6 to set the DMX address as the address of its own, and cancels the response command waiting state to end the address mode for the lighting module $12_k$ (step S8). When setting the address of its own, the DMX address is stored in a memory, for example. The extraction of the DMX address in step S8 corresponds to the extraction means.

Thus, in the address mode, each time a user touches the light-emitting surface of one lighting module, the address assignment operation described above is performed. Then, a user touches the light-emitting surface of one of the lighting modules $12_0$ to $12_n$ to which an address has not been assigned. Every time a touch is made, the address assignment operation described above is performed between the lighting module touched and the lighting control master 11.

For a lighting module that is the last one to be assigned an address, a user touches the light-emitting surface twice successively in order to give an instruction to assign an address and at the same time end the address mode (step S11). The twice-touched lighting module is denoted as $12_{end}$ (any one of $12_0$ to $12_n$).

In the lighting module $12_{end}$, the two successive touch detection outputs from the touch sensor 35 are supplied to the light emission control section 33. Moreover, the light emission control section 33 notifies the slave communication control section 32 of the two touch detections. The slave communication control section 32 generates an address request & end command in response to the two touch detections. In the address request & end command, as illustrated in FIG. 7, the command length is 0x01, and the command number is 0x11. The generated address request & end command is passed to the communication I/F section 31, and is transmitted from the communication I/F section 31 to the lighting control master 11 via the communication line 13 (step S12). The lighting module $12_{end}$, having transmitted the address request & end command, enters a response command waiting state.

In the lighting control master 11, when the communication I/F section 21 receives a command, the received command is supplied to the master communication control section 22. When it is detected that Slot 0 of the command is 0x91, indicating an original command, in the address mode, the master communication control section 22 recognizes that it is the last address request in accordance with the command number 0x11 in subsequent Slot 4, and sequentially determines the DMX address (step S13). Then, an address assignment command including the determined DMX address is generated. As described above, the address assignment command includes the upper eight bits (AD-H) of the DMX address in Slot 5, and includes the lower eight bits (AD-L) of the DMX address in Slot 6. The generated address assignment command is passed to the communication I/F section 21, and is returned by the communication I/F section 21 to the lighting module $12_{end}$ via the communication line 13 (step S14).

The operation of the lighting module $12_{end}$ having received an address assignment command is similar to that of the lighting module $12_k$ having received an address assignment command, and will not therefore be further described below. However, the slave communication control section 32 of the lighting module $12_{end}$ sets the DMX address of its own, and cancels the response command waiting state to end the address mode for the lighting module $12_{end}$ (step S15).

After passage of a predetermined amount of time (for example, 1 sec.) from the transmission of the address assignment command from the lighting control master 11 to the lighting module $12_{end}$, the master communication control section 22 generates a command to end the address mode. The generated address mode end command is passed to the communication I/F section 21, and is transmitted from the communication I/F section 21 to the lighting modules $12_0$ to $12_n$, via the communication line 13 (step S16).

The mode of operation of those of the lighting modules $12_0$ to $12_n$, that have not been touched by a user and for which the DMX addresses have not been set remains to be the address mode. If the communication I/F section 31 of such a lighting module receives the address mode end command transmitted from the lighting control master 11, and if it is detected that Slot 0 of the command is 0x91, indicating an original command, the slave communication control section 32 ends the address mode in accordance with the command number 0x01 of subsequent Slot 4 (step S17).

As the address mode ends, the mode of operation of those lighting modules for which DMX addresses have been set enters the lighting control mode. Normally, in the lighting control mode, commands are merely transmitted from the lighting control master 11 to the lighting modules $12_0$ to $12_n$.

Figure 8:
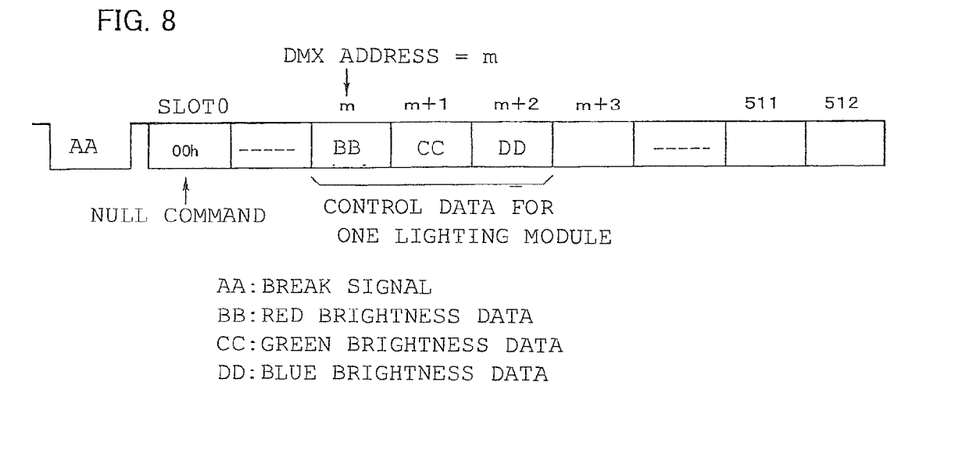
FIG. 8 is a diagram illustrating a command format for DMX commands.

In the lighting system of the embodiment, the R, G, and B brightnesses are indicated by a total of three bytes (one byte each). Therefore, three slots of a DMX command, which is a light emission control command, are used for storing control data for a single lighting module. In such a case, as illustrated in FIG. 8, Slot m (where m is a positive integer) stores red brightness data, Slot m+1 stores green brightness data and Slot m+2 stores blue brightness data, and a DMX address indicates Slot m, which is the start position of the three slots. The maximum number of devices to be connected is 512/3=170.6 . . . , i.e., up to n=170 of lighting modules $12_0$ to $12_n$, can be used.

In the lighting control master 11, if a color mixing instruction is generated from the operation section 23 through an input operation on the operation section 23 by a user in the lighting control mode, the master communication control section 22 generates a DMX command including RGB color mixing data for the lighting modules $12_0$ to $12_n$, i.e., for the DMX addresses, in accordance with the color mixing instruction. This DMX command has a data format as illustrated in FIG. 8. Then, the DMX command is transmitted from the communication I/F section 21 to the respective lighting modules $12_0$ to $12_n$, via the communication line 13.

In each of the lighting modules $12_0$ to $12_n$, the communication I/F section 31 receives the DMX command transmitted from the lighting control master 11. The received DMX command is supplied to the slave communication control section 32, and when it is detected that Slot 0 of the DMX command indicates a null command, the slave communication control section 32 extracts three consecutive slots of data, starting from the slot of the DMX command corresponding to the DMX address of its own set in step S8 or S15 described above, as red brightness data, green brightness data, and blue brightness data (this corresponds to the means for extracting control data). These RGB (red, green, blue) brightness data are supplied to the light emission control section 33. The light emission control section 33 supplies a drive current whose value corresponds to the red brightness data to between the transparent electrode 41 and the metal electrode 46(R) of the surface light source 34, supplies a drive current whose value corresponds to the green brightness data to between the transparent electrode 41 and the metal electrode 46(G), and supplies a drive current whose value corresponds to the blue brightness data to between the transparent electrode 41 and the metal electrode 46(B). Supplying these drive currents to the surface light source 34 mixes the color to be emitted from the surface light source 34.

Thus, in the lighting system of the embodiment, the touch sensor 35 is provided on the light-emitting surface of each of the lighting modules $12_0$ to $12_n$. Then, the lighting modules $12_0$ to $12_n$ can simply be assigned the DMX addresses by a user only sequentially touching the light-emitting surfaces after the lighting modules $12_0$ to $12_n$ are installed on a ceiling, a wall, or the like. Since the DMX addresses are set in the order the lighting modules are touched by a user, it is possible to clearly define the correspondence between the DMX addresses and the lighting modules $12_0$ to $12_g$.

Moreover, the lighting modules $12_0$ to $12_n$, which have been assigned DMX addresses, can easily be re-assigned DMX addresses in a different order.

Since commands are transmitted only by the lighting control master 11 so that the lighting modules $12_0$ to $12_n$ only receive commends, there can never be a collision between commands.

Note that in the embodiment described above, the lighting control master 11 transmits the address mode end command upon execution of the address assignment to the lighting module $12_{end}$ in response to a user specifying, through two successive touches, the lighting module $12_{end}$, which is the last one to be assigned an address. However, the present invention is not limited to this. For example, the lighting control master 11 may transmit the address mode end command when no address request command has been received over a predetermined amount of time since an address request command from any lighting module was received.

While a touch sensor is used as a sensor for detecting a lighting module being specified by a user in the embodiment described above, the present invention is not limited to touch sensors. For example, another sensor, such as an optical sensor for detecting light of a laser pointer, may be provided on the light-emitting surface of the lighting module, or in the vicinity thereof.

Moreover, the embodiment described above illustrates an operation of setting addresses for a plurality of lighting modules $12_0$ to $12_n$ in a lighting system in which the lighting modules $12_0$ to $12_n$ are controlled by the lighting control master 11 by using the DMX512-A standard. However, it is understood that the present invention can be used for setting addresses for lighting modules in a lighting system using a standard other than the DMX512-A standard. While wired communication is made via the communication line 13 between the lighting control master 11 and the lighting modules $12_0$ to $12_n$, wireless communication may be made between the lighting control master 11 and the lighting modules $12_0$ to $12_n$.

While an address (DMX address) represents a slot number of a DMX command in the embodiment described above, the present invention is not limited to this.

While a lighting module uses an organic EL element as a surface light source in the embodiment described above, a light-emitting element other than an organic EL element, such as an LED (light emitting diode), may be used.

REFERENCE SIGNS LIST

11 lighting control master
$12_0$-$12_n$ lighting module
13 communication line
21, 31 communication I/F section
22 master communication control section
23 operation section
32 slave communication control section
33 light emission control section
34 surface light source
35 touch sensor
36 touch panel
41 transparent electrode
42 bank
43 hole injection layer
44(R), 44(G), 44(B) light-emitting layer
45 electron injection layer
46(R), 46(G), 46(B) metal electrode

The invention claimed is:

1. A lighting module having a surface light source, and receiving a light emission control command transmitted from a master device, and driving and controlling the surface light source in accordance with control data for its own, the control data being included in the received light emission control command, the lighting module comprising:
- an external input detection sensor provided on a light-emitting surface of the surface light source or in a vicinity thereof, for detecting an external input;
- transmitting means for transmitting an address request command to the master device when the external input is detected by the external input detection sensor;
- acquisition means for receiving an address assignment command transmitted from the master device in response to the address request command so as to acquire an address included in the address assignment command; and
- means for extracting the control data for its own from the light emission control command according to the address acquired by the acquisition means.

2. The lighting module according to claim 1, wherein the external input detection sensor is a touch sensor or an optical sensor provided on the light-emitting surface.

3. The lighting module according to claim 2, wherein:
- the light emission control command is a serial communication command having a series of slots; and
- the address is an address specifying one of the series of slots.

4. The lighting module according to claim 3, wherein in response to reception of an address mode start command transmitted from the master device, a mode of operation is set to an address mode, and the external input detection sensor and the transmitting means are activated.

5. The lighting module according to claim 4, wherein the address mode is ended when the address is acquired.

6. The lighting module according to claim 5, wherein:
- the transmitting means transmits an address request-and-end command to the master device when the external input is detected by the external input detection sensor; and
- the address mode is ended in response to reception of an address mode end command from the master device while in the address mode.

7. A lighting system comprising:
- a master device for transmitting a light emission control command; and
- a plurality of lighting modules, each lighting module having a surface light source, receiving the light emission control command, and driving and controlling the surface light source in accordance with control data for its own, the control data being included in the received light emission control command, the lighting system including:
- an external input detection sensor provided on a light-emitting surface of the surface light source of each of the plurality of lighting modules or in a vicinity thereof, for detecting an external input;
- transmitting means for transmitting an address request command to the master device when the external input is detected by the external input detection sensor;
- address setting means provided in the master device, for setting an address in response to the address request command; and
- returning means for returning an address assignment command including the address which has been set by the address setting means to the lighting module which has transmitted the address request command, each of the plurality of lighting modules including:
- acquisition means for receiving the address assignment command so as to acquire an address included in the address assignment command; and
- means for extracting the control data for its own from the light emission control command according to the address acquired by the acquisition means.

* * * * *